H. L. TANNER.
INDICATOR.
APPLICATION FILED NOV. 27, 1917.

1,320,807.

Patented Nov. 4, 1919.
3 SHEETS—SHEET 1.

INVENTOR.
Harry L. Tanner
BY Herbert H. Thompson
ATTORNEY

H. L. TANNER.
INDICATOR.
APPLICATION FILED NOV. 27, 1917.
1,320,807.
Patented Nov. 4, 1919.
3 SHEETS—SHEET 2.
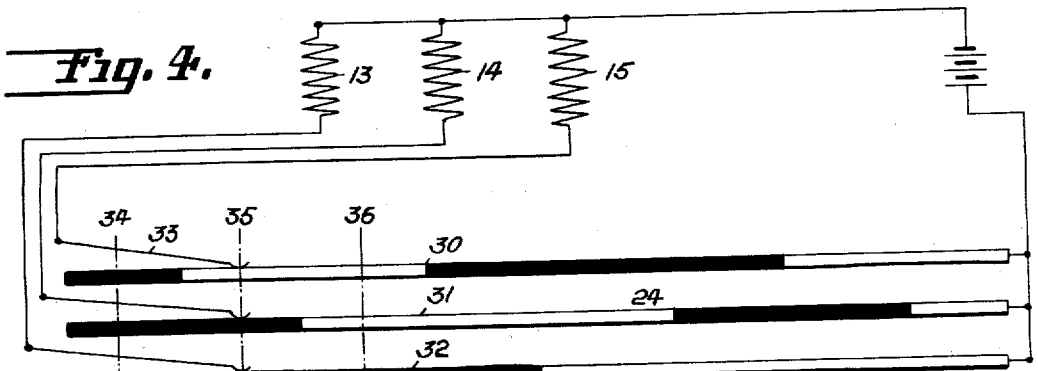
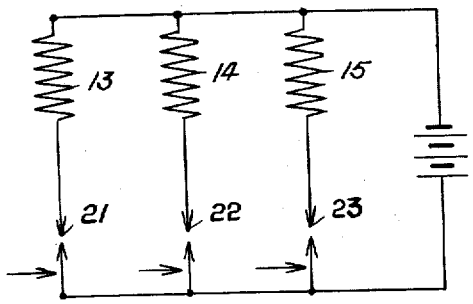
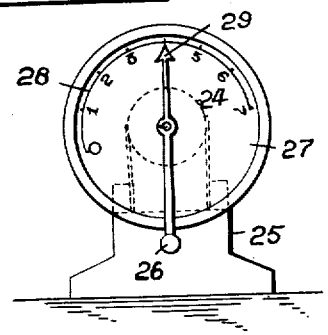
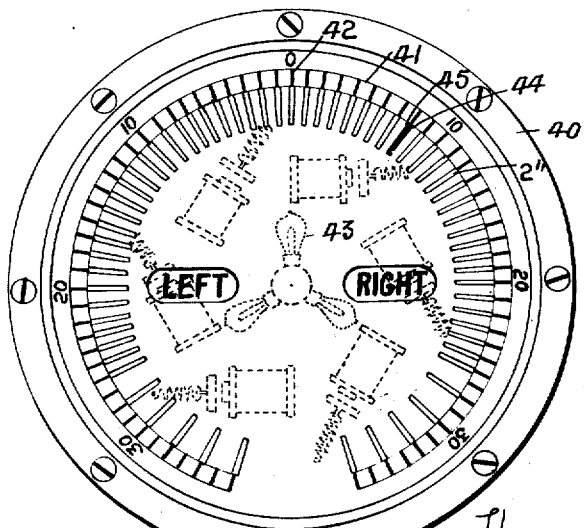
TO TRANSMITTER ON RUDDER →
INVENTOR.
Harry L. Tanner
BY Herbert H. Thompson
ATTORNEY H. L. TANNER.
INDICATOR.
APPLICATION FILED NOV. 27, 1917.
1,320,807.
Patented Nov. 4, 1919.
3 SHEETS—SHEET 3.
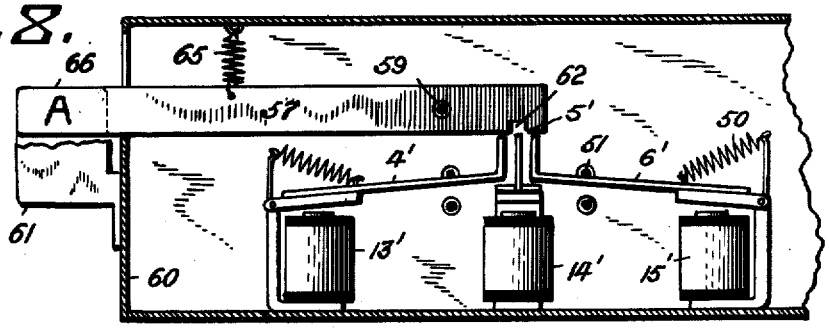
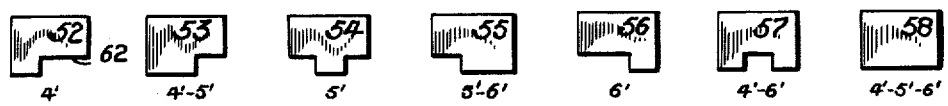
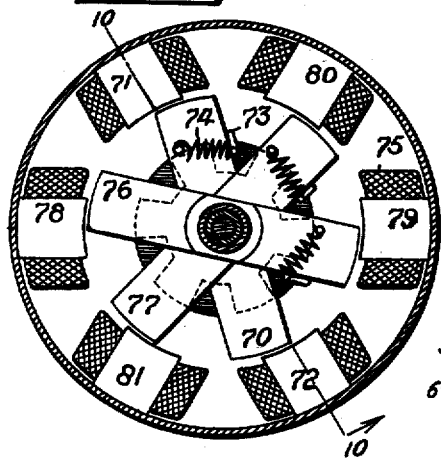
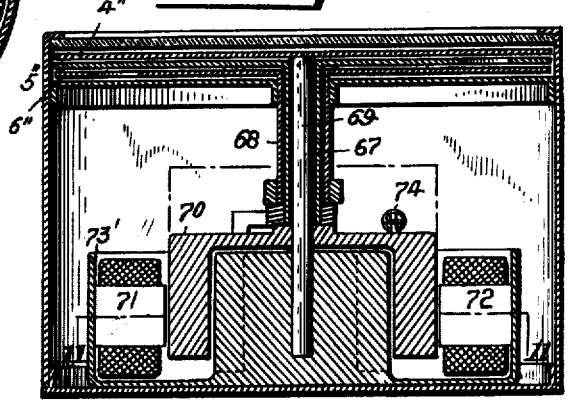
INVENTOR.
Harry L. Tanner
BY Herbert H. Thompson
ATTORNEY

UNITED STATES PATENT OFFICE.

HARRY L. TANNER, OF BROOKLYN, NEW YORK, ASSIGNOR TO TANNER ENGINEERING COMPANY, INC., OF BROOKLYN, NEW YORK, A CORPORATION OF NEW YORK.

INDICATOR.

1,320,807.  Specification of Letters Patent.  Patented Nov. 4, 1919.

Application filed November 27, 1917. Serial No. 204,146.

*To all whom it may concern:*

Be it known that I, HARRY L. TANNER, a citizen of the United States of America, residing at 1144 East 19th street, Brooklyn, in the county of Kings and State of New York, have invented certain new and useful Improvements in Indicators, of which the following is a specification.

This invention relates to changeable exhibitors adapted to indicate a comparatively large number of signals with a minimum number of moving parts and electric actuating circuits. The main object of the invention is to simplify and improve electrical indicators of this character. One special application of my invention is to indicators such as used on shipboard for showing the direction in which the rudder is turned. Other applications will readily be suggested to those skilled in the art, such as for annunciators or advertising exhibitors.

Referring to the drawings in which, what I now consider the preferred forms of my invention, are shown:

Fig. 4 is a wiring diagram of the invention showing both the wiring of the receiving instrument or indicator and the commutator of the sending instrument in developed form.

Fig. 5 is a wiring diagram in a simplified form of the electrical circuit of one form of my invention.

Fig. 6 is an elevation of one form of sending instrument.

Fig. 7 is a plan view of a rudder indicator as constructed according to my invention.

Fig. 8 is a vertical section of a modified form of exhibitor.

Fig. 9 is a diagram showing the end portions of the indicating arms or levers.

Fig. 10 is a cross section of another modified form of exhibitor, the section being taken on line 10—10 of Fig. 11.

Fig. 11 is a section on line 11—11 of Fig. 10.

Figure 1:
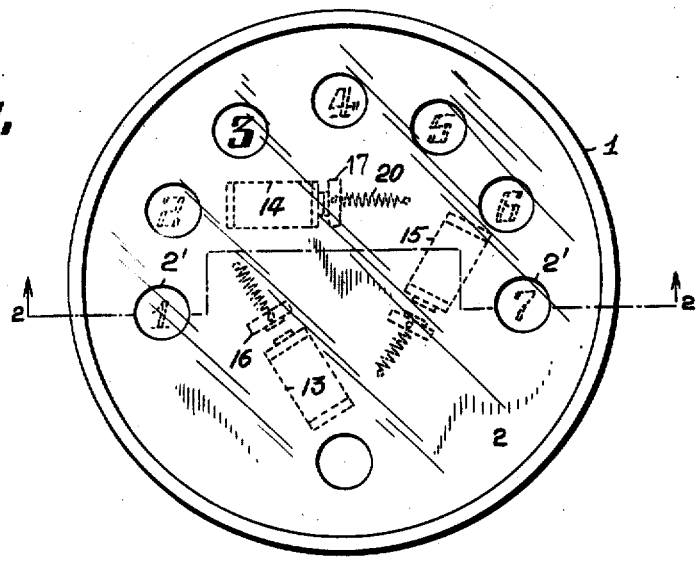
Figure 1 is a plan view of an indicator adapted for general use.
Figure 2:
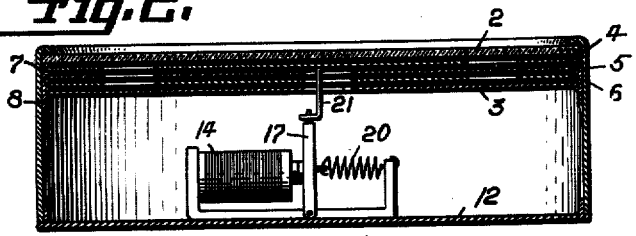
Fig. 2 is a vertical section thereof on line 2—2 of Fig. 1.
Figure 3:
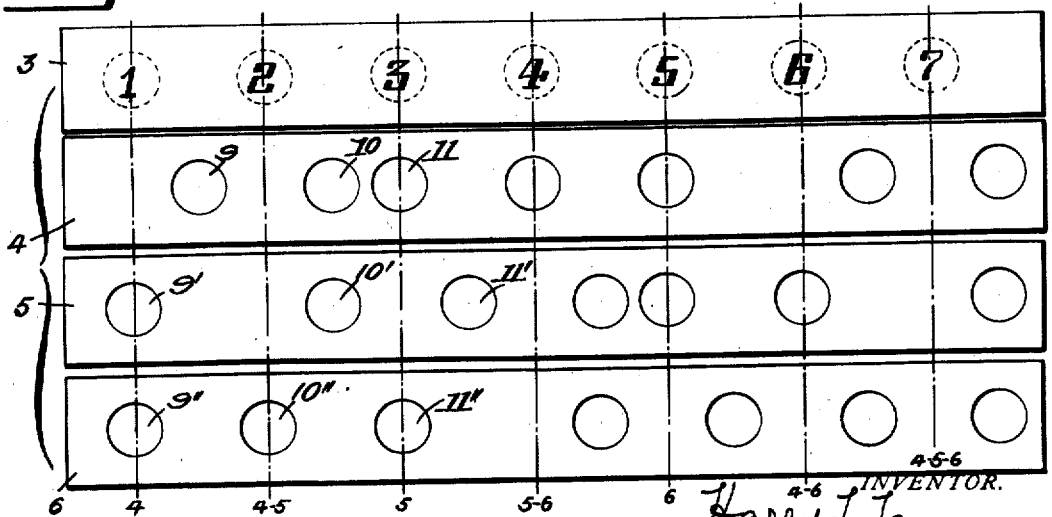
Fig. 3 is a diagram illustrating the theory of operation of my invention, in which the dials or disks of Fig. 1 are shown developed into straight strips. The figure also illustrates one form in which invention may be made.

As shown in Figs. 1 and 2, the indicator comprises a casing 1 having a transparent cover 2 with preferably circles 2' marked thereon and a back plate 3, with any desired indications thereon at spaced points such as numerals 1, 2, 3, 4, etc. Above said back plate are preferably mounted a plurality of movable elements or plates 4, 5 and 6. The said plates are shown as supported in annular grooves 7 in a supporting ring 8. Each plate is provided with a plurality of holes or openings 9, 10, 11, etc., 9', 10', 11', etc., 9'', 10'' and 11'', etc., the holes in each plate being spaced in a predetermined relation to the indications on back plate 3, and also to the holes in the other plates. In the preferred form of the invention the number of indications on the back plate and the number of holes in each of the plates is a function of the number of movable plates employed and is equal to the number of possible combinations of the number representing the number of plates. Thus in the illustration shown there are three moving plates and the number of combinations of 1, 2 and 3 taken one at a time is 3, the number of combinations of the same numbers taken two at a time is 3, while the number of combinations of 1, 2 and 3, taken three at a time is 1, the sum of all the combinations being 7, which, it will be seen is equal to the number of indications on the back plate and to the number of holes on the movable plates. It is of course obvious that certain of the indications or holes may be omitted if desired, or that the number of movable plates may be increased and thereby render the number of possible indications greater. Thus with four movable plates fifteen indications may be obtained while with five movable plates thirty-one, and with six movable plates sixty-three indications may be obtained. This last named combination is illustrated in Fig. 7 hereinafter described. Speaking generically, with $n$ plates there are $2^n-1$ combinations. In addition thereto of course there may be the closed position in which none of the indications are visible. This position of the parts is indicated in Fig. 3.

Taking up the method of locating the holes in the movable plates, it will be seen that immediately above each indication 1, 2, 3, 4, 5, 6 and 7 in the back plate is at least one blank in the movable plates. By moving plate 4 to the left in Fig. 3 one step, however, and allowing plates 5 and 6 to remain stationary the three holes 9, 9' and 9" will be brought into alinement and indication 1 will become visible. On examining all of the other indications however it will be seen that none of them are at the time visible. Now suppose plates 4 and 5 are moved one step to the left. This will bring hole 10 of plate 3 in line with indication 2, and at the same time hole 10' of plate 5 also in line with said indication. The hole 10 in plate 6 being already so located. Indication 2 will therefore become visible while none of the other indications are so visible since hole 9' in plate 5 is then moved away from the indication 1. Similarly to exhibit indication 3 plate 5 is moved one notch to the left, while the other plates remain stationary. To exhibit numeral 4, plates 5 and 6 are moved one notch to the left. To exhibit numeral 5, plate 6 alone is so moved; for numeral 6 plates 4 and 6, and for numeral 7 plates 4, 5 and 6, the number of the plate which should be moved to exhibit each number being placed thereunder. From this specific description the general method of designing the indicator will be apparent, the holes in the plates being preferably so arranged that movement of each plate, individually, will render visible a separate and distinct indication, while movement of the various possible combinations of the plates renders visible other separate and distinct indications. In Figs. 1 and 2 it will be understood that the plates are rotated a small arc instead of being moved longitudinally as shown in Fig. 3. To effect such rotation each plate may be connected to an electromagnetic means. As shown, magnets 13, 14 and 15 are mounted on the base 12 of the instrument and provided with pivoted armatures 16, 17 and 18, which are normally held in the retracted position by springs 20. Each armature may be connected to a plate to one side of its center of rotation by means of an arm 21. In the position shown in the drawings, the magnet 14 only is excited thus drawnig armature 17 against the action of spring 20 and rotating plate 5 in a counter-clockwise direction thereby exhibiting indication 3.

A simple sending instrument adapted to actuate the indicator at a distance comprises merely a plurality of switches or keys 21, 22 and 23 (see Fig. 5), each switch being in circuit with one of magnets 14, 15 or 16. Said switches may be operated either by hand or automatically to send signals to the receiving instrument. In order to operate such a switch by hand it would of course be necessary for the operator to know which button or combination of buttons to press to send out each signal. In Figs. 4 and 6 is shown a commutating device which the operator need only set to the desired indication to send to the receiving instrument the proper impulse or impulses to reproduce the indication. This device is shown as a commutator or transmitter 24 rotatably mounted on a base 25 and turned by any means such as handle 26. An indicator is provided to show the position of the commutator consisting of a fixed dial 27 having characters 28 thereon preferably to correspond to the indications on the receiving instrument and a pointer 29 revoluble with the commutator.

The commutator is provided with a plurality of circumferential strips 30, 31 and 32, each strip having conductive segments and non-conductive segments thereon. A brush 33 is provided for each circumferential strip. The conductive and non-conductive segments are laid out so as to transmit proper signals. As shown in Fig. 4 the strips are positioned to transmit the signals in substantially the same order as explained in connection with Fig. 3. Thus when the brushes are under line 34 no signal is transmitted. When under line 35 dial 4 is moved to show number 1 and of course in this position the pointer 1 indicates numeral 1 in Fig. 6. When the pointer is turned to numeral 2, the brushes will be at line 36 in Fig. 4, thus completing a circuit through the magnets of plates 4 and 5. It will thus be apparent that by my invention a large number of signals may be transmitted with comparatively few wires and with comparatively simple receiving and sending instruments. It will further be noted that there is no possibility of the indicators falling out of step with the sending instrument as so frequently happens in the step-by-step indicators employing geared repeater motors, since in my invention, each indication which it is desired to reproduce or indicate at a distance never requires more than one step movement of any part.

Fig. 7 illustrates my invention embodied in a rudder-indicator for ships. As stated above, sixty - three separate positions are shown as indicated by the rectangular marks 2" on the cover plate 50, which would require the use of only six movable plates and six magnets. The indicator is shown as comprising the casing 40 having a fixed scale 41 thereon graduated to both sides of a central or zero position 42 to indicate turning of the rudder to the left and right of its neutral position. Instead of employing indications on a back plate as in Figs. 1 and 2, the graduations are placed upon the casing or cover while the back plate may be of light colored translucent material in back of which a source of light such as lamps 43, may be placed.

The plurality of movable plates are provided in this instance with slots or rectangular openings 44 through which, when one group of slots in all of the plates comes in line, the light on the interior of the casing becomes visible as indicated by the heavy line 45. By this means an observer is able to read the indicator much more easily than if he were compelled to look at the indication visible through an opening, since the scale 41 is always visible and the light 45 will appear to travel around the scale as the rudder is turned and to point to the indications thereon, thus attracting the observer's attention immediately to the indication adjacent the light.

In accordance with the provisions of the patent statutes, I have herein described the principle of operation of my invention, together with the apparatus, which I now consider to represent the best embodiment thereof, but I desire to have it understood that the invention can be carried out by other means. Also, while it is designed to use the various features and elements in the combination and relations described, some of these may be altered and others omitted without interfering with the more general results outlined, and the invention extends to such use.

Thus, instead of effecting the changes in exhibited indications by the use of apertures or the like selectively positioned in the members moved by the electro-magnetic means, I may, by a suitable arrangement, cause said members to move selectively a plurality of indicators. In Figs. 8 and 9, one method is shown. The magnets 13', 14' and 15' in this instance are shown as adapted to depress pivoted arms or armatures 4', 5' and 6', normally elevated by springs 50 against stop pins 51. Adjacent its end, each arm is shown as bent upwardly with its upper end engaging or resting under and extending transversely of a plurality of arms 52, 53, 54, 55, 56, 57, and 58, each pivoted at 59. The arms extend without casing 60 and normally have their ends hidden by a portion 61 extending from the casing. Adjacent its inner end, the under surface of each arm is cut out at a predetermined portion 62 over one or more of the arms 4', 5' or 6' (Fig. 9), leaving a portion against which each arm is held by a spring 65 to be engaged by one or more of said arms. For the sake of simplicity the portions 62 are shown as cut out so that the arms will be actuated by the movement of substantially the same elements and in the same order as in Fig. 2. Thus in order to move arm 52, arm 4' must be actuated, since the portion of said arm over arms 5' and 6' is cut away, while in order to move arm 53, arms 4' and 5' must be depressed, etc. It will be understood that when the proper armature arms are depressed, at least one of arms 52, 53, etc., is rocked by springs 65 to elevate its outer end 66 causing an indication 67' thereon to appear above the bracket.

In Figs. 10 and 11 a modified form of electro-magnetic actuating means is shown, adapted for use in any of the various forms my invention may assume. It is shown applied, however, to the form shown in Fig. 1, in which revoluble plates 4'', 5'' and 6'' are employed. According to this form, each plate is provided with a downwardly extending sleeve or stem 67, 68, or 69, such parts being interfitting as shown. Stem 69 of plate 4'' has secured thereto adjacent its lower end an armature 70 preferably of U shape, and positioned between opposite poles 71 and 72 secured to frame 73'. The armature is normally held on a bias against stop pin 73 by spring 74, so that it is revolved through a small angle in line with the poles 71 and 72, when winding 75 is excited. Similarly sleeves 67 and 68 are provided with armatures 76 and 77 positioned across poles 78 and 79, and 80 and 81. It will be readily apparent that by the exciting of the proper poles or groups of poles, disks 4', 5' and 6' will be actuated as in Fig. 1.

Having described my invention, what I claim and desire to secure by Letters Patent is:

1. In an indicator, a plurality of movable members having a plurality of spaced apertures therein, the relative spacing on each member being such that a movement of a member causes an unobstructed opening through all members at a point, that a movement of another member causes a similar opening at another point, and that a movement of a pair of said members causes a similar opening at another point and means for so moving said members.

2. In an indicator, a plurality of slides having a plurality of spaced apertures therein, the relative spacing on each member being such that a movement of a member causes an unobstructed opening through all members at a point, that a movement of another member causes a similar opening at another point, that a movement of another member causes a similar opening at another point, that a movement of a pair of said members causes a similar opening at another point, and that a movement of another pair of said members causes a similar opening at another point and means for so moving said members.

3. In an indicator, a plurality of slides having a plurality of spaced apertures therein, the relative spacing on each member being such that a movement of a member causes an unobstructed opening through all members at a point, that a movement of another member causes a similar opening at another point, that a movement of another member causes a similar opening at another point, that a movement of a pair of said members causes a similar opening at another point, that a movement of another pair of said members causes a similar opening at another point, and that a movement of three of said members causes a similar opening at another point and means for so moving said members.

4. In a changeable exhibitor, a plurality of movable permutation elements, means for moving said elements individually a step and in groups a step, and means selectively brought into operation by such movements for exhibiting a plurality of indications of a greater number than the number of elements.

5. In a changeable exhibitor, a plurality of movable elements, means for moving each of said elements individually a step, and in groups a step, a plurality of indications, and means selectively operated by such movement of one or more of said elements for exhibiting a different indication for each separate movement and each combination of movements.

6. In an indicator, the combination with a plurality of concentric rotatable members adapted to render visible a plurality of indications upon variable movement, of means for moving said members individually or in groups comprising a plurality of concentrically arranged poles, a winding on each pole, an armature connected to each member and positioned near a pole, and yielding means for normally holding each armature to one side of the position of maximum flux through said armature.

7. A rudder indicator for ships comprising a graduated dial, a source of light underneath the same, a plurality of rotatable members between said dial and light source having apertures therein, spaced in such a manner that movement of each dial one step from its normal position and conjoint displacement of each group of two or more members a step brings into registry a different set of apertures to show a light at different points on the dial, and transmission means connected to the rudder to rotate each member in such sequence as to cause the graduations on the dial to be illuminated in order.

In testimony whereof I have affixed my signature.

HARRY L. TANNER.